United States Patent
Vermeersch

(10) Patent No.: US 7,845,252 B2
(45) Date of Patent: Dec. 7, 2010

(54) TRANSMISSION SHIFT MECHANISM HAVING INSERT MOLDED CRANK ARM

(75) Inventor: Michael C. Vermeersch, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/462,322

(22) Filed: Jul. 31, 2009

(65) Prior Publication Data

US 2009/0293660 A1    Dec. 3, 2009

Related U.S. Application Data

(62) Division of application No. 11/788,255, filed on Apr. 19, 2007, now Pat. No. 7,621,047.

(60) Provisional application No. 60/810,028, filed on May 31, 2006.

(51) Int. Cl.
*B60K 20/06* (2006.01)
*G05G 5/00* (2006.01)

(52) U.S. Cl. .................. 74/473.31; 74/473.27

(58) Field of Classification Search ............... 74/473.1, 74/473.14, 473.15, 473.3, 473.31, 473.32, 74/473.34
See application file for complete search history.

(56) References Cited

U.S. PATENT DOCUMENTS

| | | | |
|---|---|---|---|
| 2,714,304 A | 9/1952 | Dedda | |
| RE27,350 E * | 5/1972 | Jaeger | 277/411 |
| 4,006,993 A * | 2/1977 | Woerlee | 403/359.5 |
| 4,652,415 A | 3/1987 | Nguyen et al. | |
| 5,029,459 A | 7/1991 | Almblad | |
| 5,277,078 A | 1/1994 | Osborn et al. | |
| 5,328,219 A | 7/1994 | Konchan et al. | |
| 5,348,357 A | 9/1994 | Konchan et al. | |
| 5,651,290 A | 7/1997 | Osborn et al. | |
| 5,672,405 A | 9/1997 | Plank, Jr. et al. | |
| 5,709,026 A | 1/1998 | Veselaski et al. | |
| 5,842,379 A | 12/1998 | Kanamori | |
| 6,055,881 A | 5/2000 | Oda | |
| 6,113,832 A * | 9/2000 | Tanaka et al. | 264/279 |
| 6,183,681 B1 | 2/2001 | Sullivan et al. | |
| 6,426,847 B1 | 7/2002 | Dague et al. | |
| 6,698,963 B1 * | 3/2004 | Parker et al. | 403/130 |
| 6,719,067 B2 | 4/2004 | Taga | |
| 7,025,921 B2 | 4/2006 | Ilse et al. | |

(Continued)

*Primary Examiner*—Thomas R Hannon
*Assistant Examiner*—Phillip A Johnson
(74) *Attorney, Agent, or Firm*—Cantor Colburn LLP

(57) ABSTRACT

A transmission shift mechanism for use with a vehicle transmission. The transmission shift mechanism includes a user-operated selector and a sub-assembly operably disposed between said user-operated selector and the vehicle transmission. The sub-assembly includes a torque-transfer member having a first portion and a second portion wherein the first portion is pivotally secured to the transmission shift mechanism about a pivot axis and the second portion defines a section of a substantially spherical surface which is engageably disposed within a non-linear camming slot defined by the transmission shift section. The torque-transfer member takes the form of a molded polymeric body with a sheet metal insert disposed within the molded polymeric body. The second portion of the torque-transfer member may include flats to reduce the volume of polymeric material required in the manufacture of the member. A method of manufacturing such a torque-transfer member or crank arm is also disclosed.

14 Claims, 3 Drawing Sheets

U.S. PATENT DOCUMENTS

| | | |
|---|---|---|
| 7,077,432 B2 | 7/2006 | Manwaring et al. |
| 2003/0140723 A1 | 7/2003 | Zimmermann |
| 2005/0066760 A1 * | 3/2005 | Takikawa .................. 74/473.31 |
| 2008/0098841 A1 | 5/2008 | Vermeersch |

\* cited by examiner

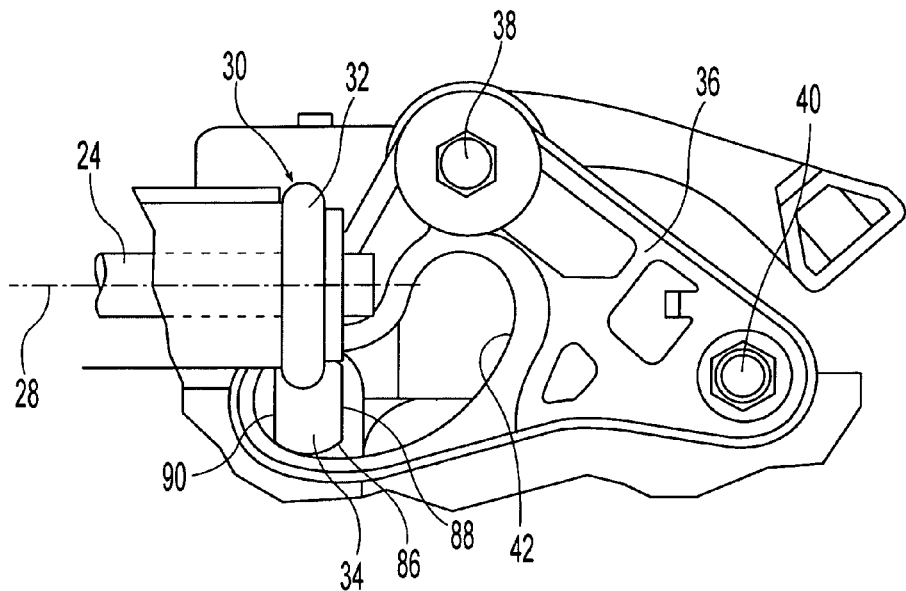
Fig. 2
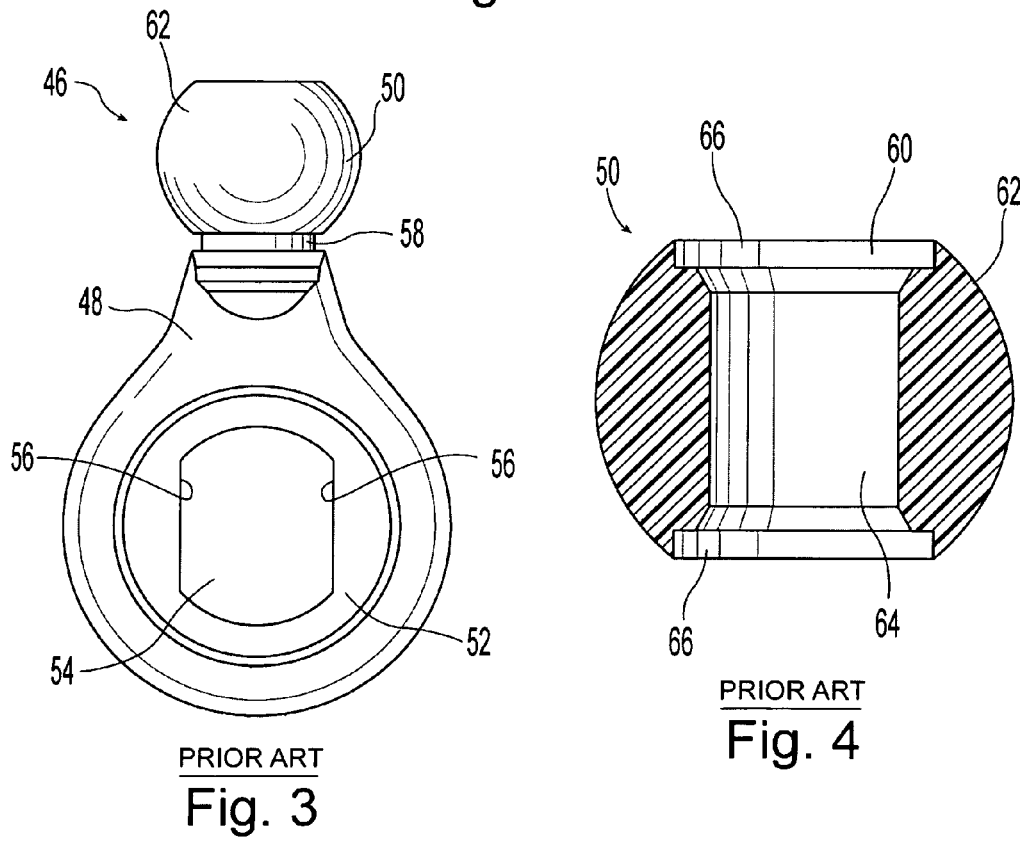
PRIOR ART
Fig. 3
PRIOR ART
Fig. 4

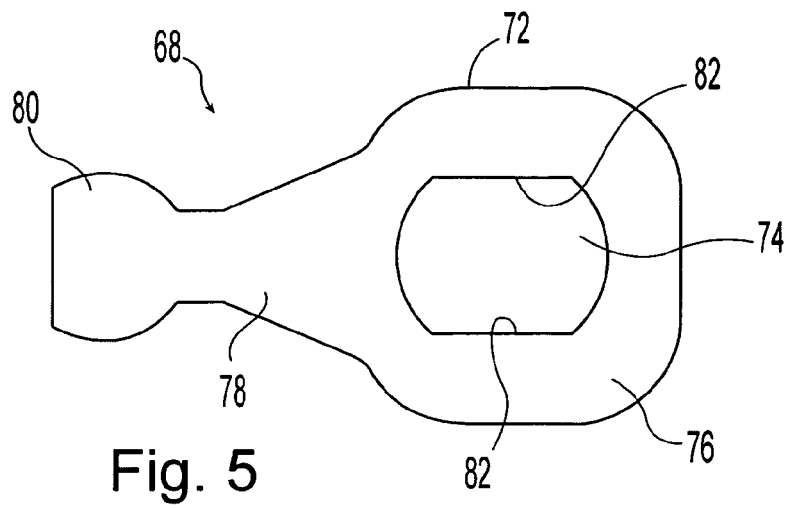
Fig. 5
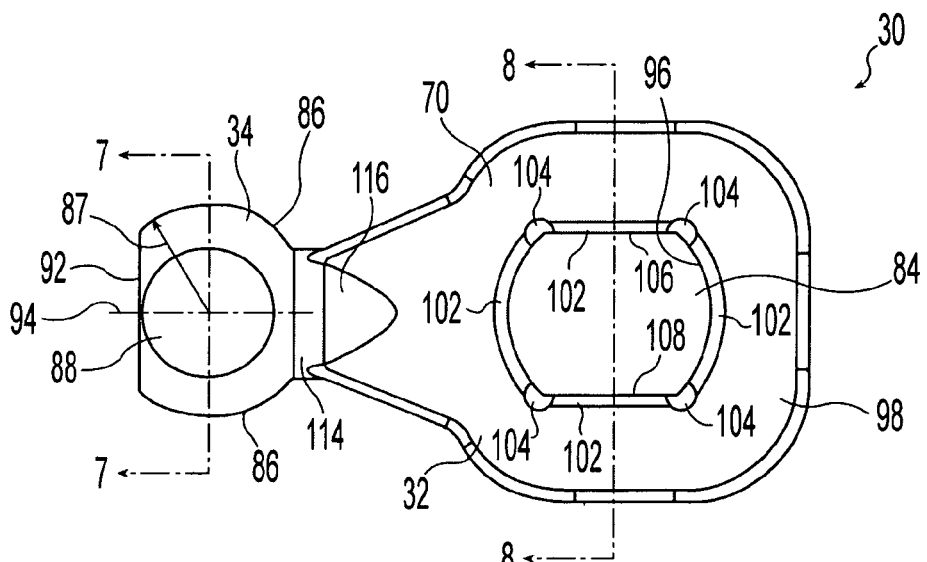
Fig. 6
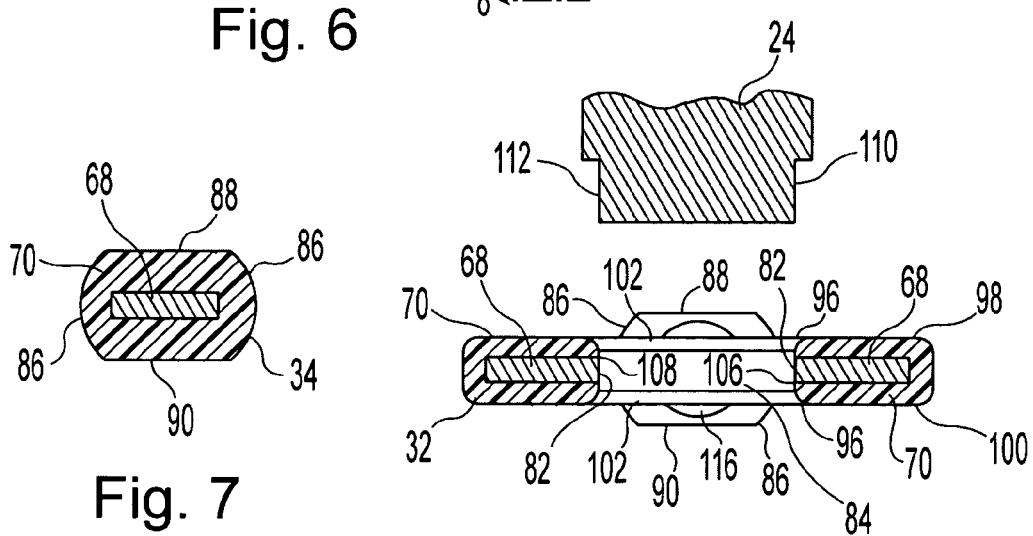
Fig. 7
Fig. 8

TRANSMISSION SHIFT MECHANISM HAVING INSERT MOLDED CRANK ARM

CROSS REFERENCE TO RELATED APPLICATIONS

This application is a divisional application and claims priority under 35 U.S.C. 121 of U.S. patent application Ser. No. 11/788,255 filed on Apr. 19, 2007 which claims priority under 35 U.S.C. 119(e) of U.S. provisional patent application Ser. No. 60/810,028 filed on May 31, 2006. The disclosures of both of these two applications are hereby incorporated herein by reference.

BACKGROUND OF THE INVENTION

1. Field of the Invention

The present invention relates to a transmission shift assembly and, more particularly, to a transmission shift assembly having a molded crank arm.

2. Description of the Related Art

Vehicles having an automatic transmission oftentimes have a shift lever mounted on the steering column of the vehicle. Many of these shift mechanisms have an actuator-driving crank arm that includes an arm portion component with a ball component mounted on the arm portion to provide the crank arm with a substantially spherically-shaped ball end. In some known mechanisms, the ball component of the crank arm is rotatable relative to its arm portion component while in other known mechanisms, the ball component is fixed to the arm portion and cannot rotate relative to the arm portion.

In such known mechanisms, the ball component is often disposed within an arcuate cam slot opening located on a pivoting actuator. Rotational movement of the crank arm moves the actuator between various positions about its pivot point. One end of a cable or linkage is attached to the actuator with the other end being attached to the gear selector of the transmission of the vehicle so that movement of the cable effects transmission gear selection.

The arm portion of such typical crank arms is generally manufactured from a steel rod bar stock in a progressive, cold forming stamping process that requires several separate forming and machining operations to yield the arm portion.

In a subsequent metal forming operation, the ball component of the crank arm is then attached, typically by being staked onto the stamping that forms the arm portion. Generally, the staking process will fix the ball on the crank arm in a manner that does not allow the ball to rotate relative to the crank arm. The assembly process whereby the ball component is assembled to the arm portion can produce scrap from over/under staking. Additionally, the staking of the ball sometime produces inconsistent positional tolerances and/or results in failure due to ball separation.

The arm portion requires selective orientation at the next level of assembly wherein the crank arm is attached to its rotatable shift shaft. The ball component is typically a self-lubricating plastic that has a shape formed by a machining process. When staking the ball component on the arm portion to non-rotationally fix the ball on the crank arm, the rotational position of the ball component is generally not controlled and, thus, the entire exterior surface of the ball must be precisely formed, even though in operation a substantial portion of the ball exterior surface may never engage a surface of the actuator cam opening.

The use of a staking process that fixes the ball component on the arm portion component without allowing the ball to rotate will generally be less expensive than attaching the ball component to the arm portion in a manner that allows the ball to rotate relative to the arm portion. For example, it is known to use a shoulder bolt to rotatably attach a ball component. Ball components used to manufacture crank arms using a staking process are generally formed by machining an extruded plastic material. By machining an extruded plastic material to form the ball, the dimensions of the ball can be controlled. Moreover, a ball formed by machining an extruded plastic material will have greater strength than a similar ball formed by injection molding. The differential cooling of an injection molded ball component will oftentimes reduce the strength of the ball near its exterior surface which will be placed in sliding engagement with the cam slot when the ball is non-rotatably staked to the arm portion. Although the machining of extruded plastic material to form a ball component is generally more expensive than injection molding a ball component, when injection molded ball components are non-rotationally attached to a crank arm using a staking process they are placed in sliding engagement with a camming slot, they provide a less durable and reliable product than a crank arm having a non-rotationally staked ball component that is formed by machining an extruded plastic material. Thus, the ball component must typically be formed using the relatively more expensive process of machining an extruded material.

Accommodating the manufacturing and assembly-related factors of known shift mechanism crank arms make such crank arms undesirably expensive.

SUMMARY OF THE INVENTION

The present invention provides a transmission shift mechanism having a torque-transfer member or crank arm that is formed by injection molding and includes a metal insert to provide enhanced strength for the torque-transfer member.

The invention comprises, in one form thereof, a transmission shift mechanism for use with a vehicle transmission. The transmission shift mechanism includes a user-operated selector and a sub-assembly operably disposed between said user-operated selector and the vehicle transmission. The sub-assembly includes a torque-transfer member having a first portion and a second portion wherein the first portion is pivotally secured to the transmission shift mechanism about a pivot axis and the second portion defines a section of a substantially spherical surface section which is engageably disposed within a non-linear camming slot defined by the transmission shift section. The torque-transfer member takes the form of a molded polymeric body with a sheet metal insert disposed within the molded polymeric body.

In some embodiments of the assembly, the spherical surface section defines a first radius and the second portion further defines first and second flats whereby the volume of the second portion is less than a volume of a sphere defined by the first radius. The second portion is configured such that the first and second flats are disposed on opposite sides of the sheet metal insert and oriented substantially parallel to the sheet metal insert. The first portion of the torque-transfer member defines an opening extending through the first portion in a direction parallel to the pivot axis and which receives a projection to thereby pivotally couple the first portion with the transmission shift mechanism. The opening also forms outer perimeters on first and second opposing sides of the first portion with each of the outer perimeters defining a beveled edge. The opening also defines fourth and fifth flats for engaging the projection. The sheet metal insert defines at least a portion of the fourth and fifth opposing flats and the portion of said fourth and fifth opposing flats defined by the insert engages the projection. The beveled edges on the first and second opposing sides of the first portion are each defined by the polymeric body.

The invention comprises, in another form thereof, a method of manufacture. The method includes stamping a sheet metal stock material to form an insert and placing the insert in a mold and injection molding a polymeric material to define a polymeric body wherein the insert is disposed within the polymeric body and wherein the polymeric body defines a first portion and a second portion, the second portion defining a section of a substantially spherical surface. The method also includes installing the polymeric body in a transmission shift mechanism by pivotally securing the first portion to the transmission shift mechanism and engageably disposing the spherical surface section in a non-linear camming slot defined by the transmission shift mechanism.

In some embodiments of the method, the insert has a stamped configuration immediately following the step of stamping a sheet metal stock material to form the insert and the sheet metal insert has a configuration substantially unchanged from the stamped configuration when the polymeric body is installed in the transmission shift mechanism.

In still other embodiments of the method, the polymeric body has a molded configuration immediately following the injection molding process and the polymeric body is installed in the vehicular transmission shift mechanism having a configuration substantially unchanged from the molded configuration.

An advantage of the present invention is that it provides a transmission shift mechanism having a torque-transfer member that can be efficiently manufactured.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 2 is an enlarged view of a portion of the transmission shift mechanism shown in FIG. 1.

FIG. 3 is a view of a prior art crank arm for a transmission shift mechanism.

FIG. 4 is a cross sectional view of the ball portion of the crank arm of FIG. 3 taken through the center of the ball portion.

FIG. 5 is a view of a metal insert for use in a crank arm in accordance with the present invention.

FIG. 6 is a view of a crank arm in accordance with the present invention.

FIG. 7 is a cross sectional view of the crank arm of FIG. 6 taken through line 7-7.

FIG. 8 is a cross sectional view of the crank arm of FIG. 6 taken through line 8-8.

Figure 1:
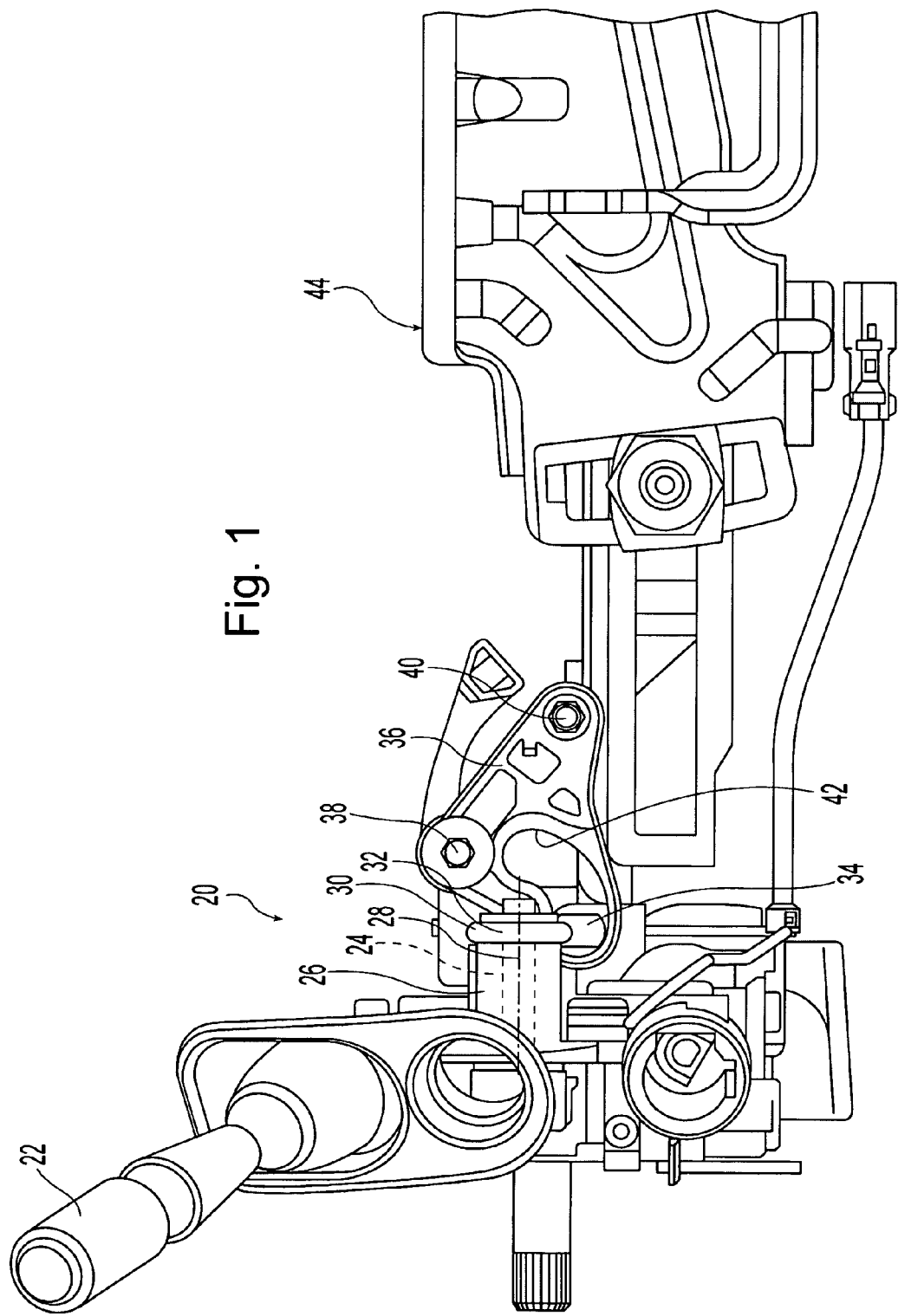
FIG. 1 is a view of a portion of a steering column with a transmission shift mechanism mounted thereon.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

An automatic transmission shift mechanism 20 is depicted in FIGS. 1 and 2. Shift mechanism 20 includes a driver-operated shift lever 22 for selection of one of the gears or gear arrangements of the automatic transmission, e.g., park-reverse-neutral-drive-low (PRNDL). Lever 22 is coupled to a rotatable shift shaft 24 which extends through housing 26 and defines an axis 28. A crank arm or torque-transfer member 30 is rotatably fixed to shift shaft 26. Movement of lever 22 rotates shift shaft 24 and thereby rotates or pivots crank arm 30 about axis 28 through a defined range of motion.

Crank arm 30 includes a first portion 32 and a second portion 34. Crank arm 30 is coupled with shift shaft 24 via first portion 32 and is coupled with actuator 36 via second portion 34. Actuator 36 is rotatably attached at pivot point 38 to housing 26 and includes an attachment member 40. A cable or linkage (not shown) is attached at one end to attachment member 40 and is attached at its other end to the gear selector of a vehicle transmission (not shown).

Actuator 36 also includes an arcuate camming slot 42 in which second portion 34 is disposed. Movement of lever 22 rotates both shift shaft 24 and attached crank arm 30 thereby causing second portion 34 of crank arm 30 to move through an arc. As second portion 34 moves, it forcibly engages camming slot 42 and pivots actuator 36 about its pivot point 38. The pivoting movement of actuator 36 and attachment member 40 results in the changing of the gear of the vehicle transmission via the cable or linkage (not shown) secured to both attachment member 40 and the gear selector of the transmission (not shown). The illustrated shift mechanism 20 is mounted on a steering column assembly 44.

Except for crank arm 30, which is discussed in greater detail below, the above-described operation and structure of shift mechanism 20 is well known in the art. FIGS. 3 and 4 illustrate a prior art crank arm 46. The use of crank arm 46 with shift mechanism 20 is also well known in the art.

Prior art crank arm 46 includes an arm component 48 and a ball component 50. Arm component 48 is formed from a steel rod or other suitable material in a progressive cold stamping operation and includes a thin generally planar portion 52. A slug is punched from planar portion 52 to form aperture 54 having flats 56. Shift shaft 24 is inserted through aperture 54 and engages flats 56 when securing crank arm 46 to shift mechanism 20. Aperture 54 is provided with a chamfer along its edge on one side of planar portion 52 to ease assembly of the crank arm 46 on the shift shaft 24. Punch tolerances prevent the chamfer from being formed on both sides of planar portion 52 and, consequently, crank arm 46 must be properly oriented with regard to the single chamfered side of crank arm 46 when securing crank arm 46 to shift shaft 24.

Arm component 48 also includes a generally cylindrical post 58 on which ball component 50 is mounted. Post 58 is inserted through opening 60 in ball 50 and its end is staked to secure ball 50 on arm component 48. Ball component 50 is formed by extruding a polymeric material, e.g., acetal, and then machining the material to form the substantially spherical exterior surface 62 and opening 60 of ball 50.

Opening 60 has a central cylindrical section 64 and cylindrical counterbores 66 at opposite ends of opening 60. The staking operation deforms the distal end of post 58 such that the deformed portion fills the distal counterbore 66 of opening 60 to attach ball component 50 to arm component 48. The staking attachment of ball 50 on post 58 fixes ball 50 to post 58 in a manner that does not allow ball 50 to rotate. The more complex, and thus expensive, use of a shoulder bolt to attach ball 50 would allow ball 50 to rotate. In either case, because the rotational orientation of ball 50 is not controlled during the staking operation, the exterior surface 62 of ball component 50 must be machined to close tolerances for its full circumference to provide an acceptable level of rolling or sliding engagement with camming slot 42. Not only must the arm and ball components 48, 50 meet their respective tolerances, but the deformation and cracking of ball component 50 must be prevented during the staking operation. As will be understood by a person having ordinary skill in the art, the proper operation and durability of shift mechanism 20 is highly sensitive to the process by which prior art crank arm 46 is manufactured and assembled.

Turning now to FIGS. 5 and 6, a crank arm 30 in accordance with the present invention is shown in greater detail. Crank arm 30 is an overmolded part having a stamped sheet metal insert 68 and an overmolded polymeric body 70. As mentioned above, crank arm 30 is a sub-assembly of transmission shift mechanism 20 operably disposed between the user-operated selector 22, which in the embodiment illustrated in FIG. 1 is a steering column mounted shift lever, and actuator 36 which, in turn, is operably coupled to the vehicle transmission (not shown) via a cable or other suitable linkage (not shown).

Sheet metal insert 68 can be formed out of sheet metal stock material, e.g., a sheet steel material, using a conventional stamping process as will be realized by those having ordinary skill in the art. As can be seen with reference to FIG. 5, sheet metal insert 68 is stamped to define an outer perimeter 72 and to remove a slug to thereby form aperture 74. Sheet metal insert 68 includes a body portion 76 which fully circumscribes aperture 74 and consequently also fully circumscribes opening 84 which extends through first portion 32 of crank arm 30. Insert 68 also includes a neck portion 78 that connects body portion 76 with a head portion 80 that extends into second portion 34 of crank arm 30.

After insert 68 has been stamped, it is placed in a mold and a polymeric material is injection molded therein to form polymeric body 70 with insert 68 disposed therein. The use of an overmolding process to form a polymeric body having a metal insert located therein is well-known to those having ordinary skill in the art. In the illustrated embodiment, insert 68 does not require any machining after being formed by the stamping process. In other words, the configuration of sheet metal insert 68 when it is installed in transmission shift mechanism 20 is substantially the same as the configuration of sheet metal insert 68 produced by the stamping process.

Polymeric body 70 forms first portion 32 and second portion 34. The second portion 34 of body 70 defines a section 86 of a substantially spherical surface. This spherical surface section 86 directly engages non-linear camming slot 42 to pivot actuator 36 about pivot point 38 as crank arm 30 is rotated about axis 28. Because second portion 34 is an integral part of body 70 and spherical surface section 86 does not rotate or otherwise move relative to the remainder of body 70 and spherical surface section 86 is formed at a known and fixed position relative to the remainder of body 70, spherical surface section 86 does not have to fully encircle axis 28 to ensure that the surfaces of second portion 34 that will come into contact with camming slot 42 are spherical surfaces. As a result, first and second flats 88, 90 can be formed on second portion 34. This is in contrast to the prior art crank arm 46 shown in FIGS. 3 and 4 where ball component 50 has a spherical surface that fully encircles the axis defined by the shift shaft.

As seen in FIG. 7, first and second flats 88, 90 are disposed on opposite sides of sheet metal insert 68 and are oriented substantially parallel to planar insert 68. As can be seen with reference to FIGS. 1 and 2, this orientation results in spherical surface section 86 being positioned to engage the surfaces of camming slot 42 and flats 88, 90 extending across the width of slot 42. Second portion 34 also defines a third flat 92 which is positioned on the distal end of crank arm 30 and, in the illustrated embodiment, is positioned substantially perpendicular to axis 28, flats 88, 90 and planar insert 68.

Spherical surface section 86 defines a radius 87 (FIG. 6). The use of one or more flats 88, 90 and 92 on second portion 34 reduces the volume of second portion 34 in comparison to a complete sphere having a radius 87. Thus, the use of such flats reduces the amount of material required to form polymeric body 70 and thereby reduces the material costs of crank arm 30. Although substantially planar flats 88, 90 are used in the illustrated embodiment, alternative embodiments of the present invention may provide a second portion 34 having a volume that is less than a sphere having a radius 87 wherein non-planar surfaces are disposed in the area of surfaces 88, 90 to provide a reduction in the volume of second portion 34.

It is further noted that the mold halves used in the injection molding of polymeric body 70 may advantageously define a parting line along opposite sides of polymeric body 70 that corresponds to central axis line 94 shown in FIG. 6. When crank arm 30 is installed in mechanism 20, pivot axis 28 of crank arm 30 is positioned substantially perpendicular to the central axis 94 of polymeric body 70. By placing the parting line along flats 88, 90, parallel to axis line 94, any artifacts of the parting line that are formed on the exterior surface of polymeric body 70 such as grooves or ridges will be at a location that will not directly engage camming slot 42. Thus, even if such artifacts are present, there will not be any need to remove the artifacts with post-molding machining or other manufacturing operations.

The first portion 32 of crank arm 30 defines an opening 84 that extends through first portion 32 in a direction parallel to pivot axis 28 (when crank arm 30 is installed in mechanism 20). A projection 24, which takes the form of the distal end of a shift shaft in the illustrated embodiment, is inserted into opening 84 to pivotally couple first portion 32 with transmission shift mechanism 20 when installing crank arm 30. Opening 84 defines an outer perimeter 96 on first and second opposing sides 98, 100 of crank arm 30. In the illustrated embodiment, each of the outer perimeters 96 has a common shape and configuration. As best seen in FIGS. 6 and 8, each of the outer perimeters 96 are formed by a beveled edge 102. Beveled edges 102 form inclined surfaces that flare outwardly to enlarge opening 84 at its outermost extent and thereby facilitate the insertion of projection 24 into opening 84. The illustrated embodiment further includes a small depression or corner relief 104 positioned at each of the four corners defined by opening 84.

Opening 84 is a non-circular opening and includes two flats 106, 108 positioned on opposite sides of opening 84. The insertion of shift shaft 24 into opening 84 engages opening flats 106, 108 with corresponding flats 110, 112 on shift shaft 24. The engagement of these flats in opening 84 and on shift shaft 24 rotationally fixes crank arm 30 and shift shaft 24 so that crank arm 30 rotates together with shift shaft 24. As best seen in FIG. 8, flats 82 on sheet metal insert 68 define a portion of each flat 106, 108. When metal shift shaft 24 has been inserted into opening 84, that portion of opening flats 106, 108 that is defined by insert flats 82 engage corresponding flats 110, 112 on shift shaft 24 thereby providing direct metal on metal contact between shift shaft 24 and insert 68. The direct force-transmitting contact between insert 68 and shift shaft 24 reduces the stresses applied to the polymeric body 70 surrounding metal insert 68 and allows metal insert 68 to more effectively transfer torque supplied by shift shaft 24 from the first portion 32 of crank arm 30 to the second portion 34 of crank arm 30.

Although the illustrated non-circular opening 84 utilizes flats 106, 108, alternative embodiments of non-circular openings may employ alternative non-circular shapes that do not include flat planar surfaces to rotationally fix crank arm 30 with projection 24.

The pivoting of crank arm 30 about axis 28 occurs as shift shaft 24 is rotated about axis 28 by the manual operation of shift lever 22. During this pivoting movement of crank arm 30, spherical surface section 86 will slidingly engage camming slot 42 causing actuator 36 to pivot about point 38. As will be recognized by those having ordinary skill in the art, the reinforcement of molded body 70 with metal insert 68 will provide crank arm 30 with enhanced strength and a greater ability to withstand stresses imposed on crank arm 30 due to the pivoting crank arm 30 and sliding engagement of spherical surface section 86 with camming slot 42.

As best seen in FIG. 8, beveled edges 102 are defined by polymeric body 70 and can, therefore, be formed during the molding of polymeric body 70 without requiring a secondary machining operation. By providing a beveled edge 102 on both sides of polymeric body 70, shift shaft 24 can be easily inserted into either side of opening 84 and there is no need to directionally position crank arm 30 during assembly as required with crank arms having a chamfer or beveled edge on only one side as exemplified by prior art crank arm 46. If a machining operation was required to provide such a chamfer or beveled edge, it would be typical to form such an edge on only one side of the crank arm to reduce machining costs. Thus, the formation of beveled edges on both sides of opening 84 during the molding of polymeric body 70 not only eliminates the need for a secondary machining operation to produce such a beveled edge, but also facilitates the manufacture of transmission shift mechanism 20 by allowing shift shaft 24 to be inserted into either side of opening 84.

The first portion 32 of polymeric body 70 also defines a neck portion which includes a short cylindrical section 114 and a conical portion 116 which form a transition to second portion 34 which defines a spherical surface section 86 and flats 88, 90, 92. With reference to FIG. 7, it can be seen that in the illustrated embodiment, the outer perimeter 72 of insert 68 within second portion 34 is disposed within polymeric body 70 and does not engage camming slot 42. As best seen in FIG. 5, the head portion 80 of insert 68 does not include any apertures or openings and substantially divides second portion 34 of polymeric body 70. Alternative embodiments of insert 68 may include openings in head portion 80 whereby the opposite sides of polymeric body 70 in second section 34 are integrally joined through such openings in head portion 80.

Polymeric body 70 may be formed out of any suitable plastic material and, in the illustrated embodiment, is formed by an injection molding process using an acetal material. Advantageously, the polymeric material used to form member 34 is a self-lubricating material. Self-lubricating polymeric materials which may be suitable for one or more of the various alternative embodiments of the present invention include acetal, nylon, polytetrafluoroethylene (PTFE) available under the trademark Teflon, ultra high molecular weight polyethylene (UHMWPE), and other suitable materials known to those having ordinary skill in the art. As discussed above, polymeric body 70 does not require any machining after being formed by the injection molding process. In other words, the configuration of polymeric member 34 when it is installed in transmission shift mechanism 20 is substantially the same as the configuration of polymeric member 34 produced by the injection molding process.

Crank arm 30 can be manufactured in a relatively inexpensive and efficient manner. As discussed above, sheet metal insert 68 is formed by a conventional stamping process and does not require any post-stamping machining processes in its manufacture. The ability to form metal insert 68 using a stamping process without any machining provides an efficient and relatively low cost method for manufacturing sheet metal insert. After metal insert 68 is formed by stamping, it is placed in a mold and polymeric body 70 is injection molded about insert 68.

The ability to use a conventional injection molding process to form polymeric body 70 is advantageous because no machining operations are required on the injection molded polymeric body 70. The elimination of machining operations helps to contain the cost of manufacturing crank arm 30. The use of an injection molding process to form polymeric body 70 also has additional benefits. For example, the injection molding of polymeric body 70 allows crank arm 30 to have a symmetrical design, the placement of beveled edges 102 on both sides of opening 84 providing a noteworthy example of such symmetry, thereby facilitating the installation of crank arm 30 within transmission shift mechanism 20. Machined and otherwise manufactured parts can also be provided in symmetrical shapes, however, the designer will often be confronted with the trade-off between machining both sides of a part or machining a single side and requiring the part to be positionally oriented when installing it in a larger assembly. Additionally, the corners and transitions of a molded part can often be shaped to reduce the stress concentrations at such points.

Although the use of a non-rotating spherical surface section 86 to slidingly engage camming slot 42 will increase the stress on spherical section 86 in comparison to the use of a rotatable ball engaged with camming slot 42 and injection molded components are generally less robust than machined extruded components at withstanding such surface stresses, the use of a metal insert 68 with polymeric body 70 helps to minimize such disadvantages. Furthermore, the use of a molding process to form spherical surface section 86 at a known and pre-defined orientation with respect to first portion 32 of crank arm 30 allows flats 88, 90 to be placed on second portion 34 thereby reducing the amount of material required to produce crank arm 30.

While this invention has been described as having an exemplary design, the present invention may be further modified within the spirit and scope of this disclosure. This application is therefore intended to cover any variations, uses, or adaptations of the invention using its general principles.

What is claimed is:

1. A transmission shift mechanism for use with a vehicle transmission comprising:
    a user-operated selector; and
    a sub-assembly operably disposed between said user-operated selector and the vehicle transmission, said sub-assembly including:
    a torque-transfer member having a first portion and a second portion, said first portion being pivotally secured to said transmission shift mechanism about a pivot axis, said second portion defining a section of a substantially spherical surface, said spherical surface section being engageably disposed within a non-linear camming slot defined by said transmission shift mechanism, said torque-transfer member being formed by a molded polymeric body having a sheet metal insert disposed therein, said first portion having a non-circular opening extending therethrough in a direction parallel to said pivot axis, said opening comprising a plurality of corners each having a small depression or corner relief therein, said opening receiving a projection to thereby pivotally couple said first portion with said transmission shift mechanism with said sheet metal insert in direct force transmitting engagement with said projection, said opening forming outer perimeters on opposing first and second sides of said first portion, each of said outer perimeters defining a molded beveled edge defined by said polymeric body, wherein said projection is configured to be received in said opening from either of the first side or the second side.

2. The transmission shift mechanism of claim 1 wherein said spherical surface section defines a first radius and said second portion has a volume that is less than a volume of a sphere defined by said first radius.

3. The transmission shift mechanism of claim 2 wherein said second portion defines first and second flats disposed on opposite sides of said sheet metal insert and oriented substantially parallel to said sheet metal insert.

4. The transmission shift mechanism of claim 3 wherein said second portion defines a third flat on a distal end of the torque-transfer member comprising said second portion, said third flat is perpendicular to said first and second flats.

5. The transmission shift mechanism of claim 1 wherein said opening is a non-circular opening; said sheet metal insert is in direct force transmitting engagement with said projection; and said beveled edges on said first and second opposing sides of said first portion are each defined by said polymeric body.

6. The transmission shift mechanism of claim 5 wherein said sheet metal insert extends into said second portion.

7. The transmission shift mechanism of claim 6 wherein said sheet metal insert fully circumscribes said opening.

8. The transmission shift mechanism of claim 1 wherein said spherical surface section defines a first radius and said second portion defines first and second flats whereby the volume of said second portion is less than a volume of a sphere defined by said first radius, said first and second flats being disposed on opposite sides of said sheet metal insert and oriented substantially parallel to said sheet metal insert;
   said opening defining opposing first and second opening flats for engaging said projection; and
   wherein said sheet metal insert defines at least a portion of said first and second opening flats and said portion of said first and second opening flats defined by said insert engages said projection.

9. The transmission shift mechanism of claim 8 wherein said sheet metal insert fully circumscribes said opening and extends into said second portion.

10. The transmission shift mechanism of claim 1 wherein said second portion defines a flat on a distal end of the torque-transfer member comprising said second portion, said flat is perpendicular to said sheet metal insert.

11. The transmission shift mechanism of claim 1 wherein said sheet metal insert comprises a stamped sheet metal insert, and wherein said stamped sheet metal insert is disposed in the molded polymeric body substantially the same as when stamped.

12. The transmission shift mechanism of claim 1 wherein said beveled edges of said opposing first and second sides comprise molded beveled edges.

13. The transmission shift mechanism of claim 1 wherein said molded polymeric body comprises a self-lubricating polymer material.

14. The transmission shift mechanism of claim 13 wherein said self-lubricating polymer material comprises acetal, nylon, polytetrafluoroethylene or ultra high molecular weight polyethylene.

\* \* \* \* \*